M. C. CHRISTENSEN.
UNIVERSAL SHAFT COUPLING.
APPLICATION FILED MAR. 30, 1914.
1,142,750.
Patented June 8, 1915.
3 SHEETS—SHEET 1.
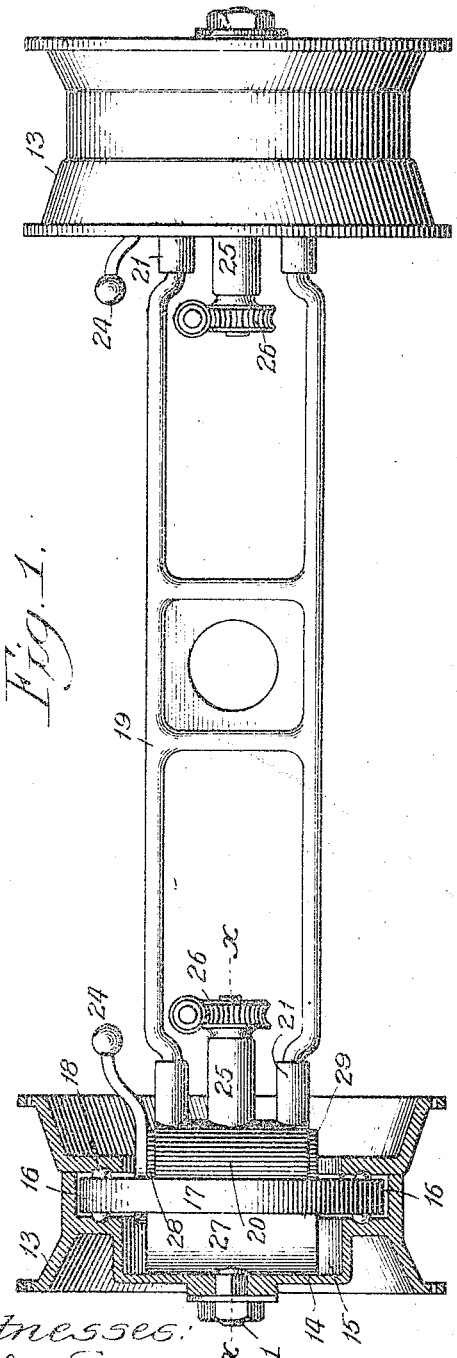
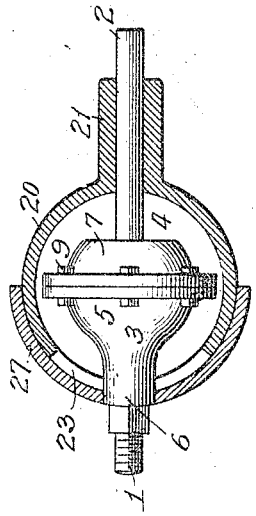
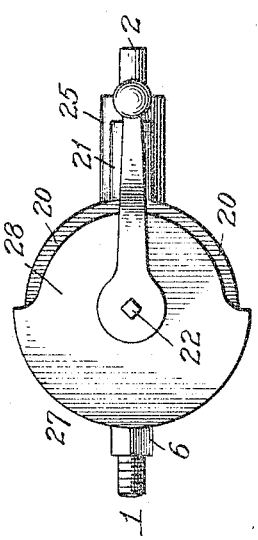
Witnesses:
John Enders
M. H. Holmes
Inventor:
Mons C. Christensen,
by Robert Burns
Atty.

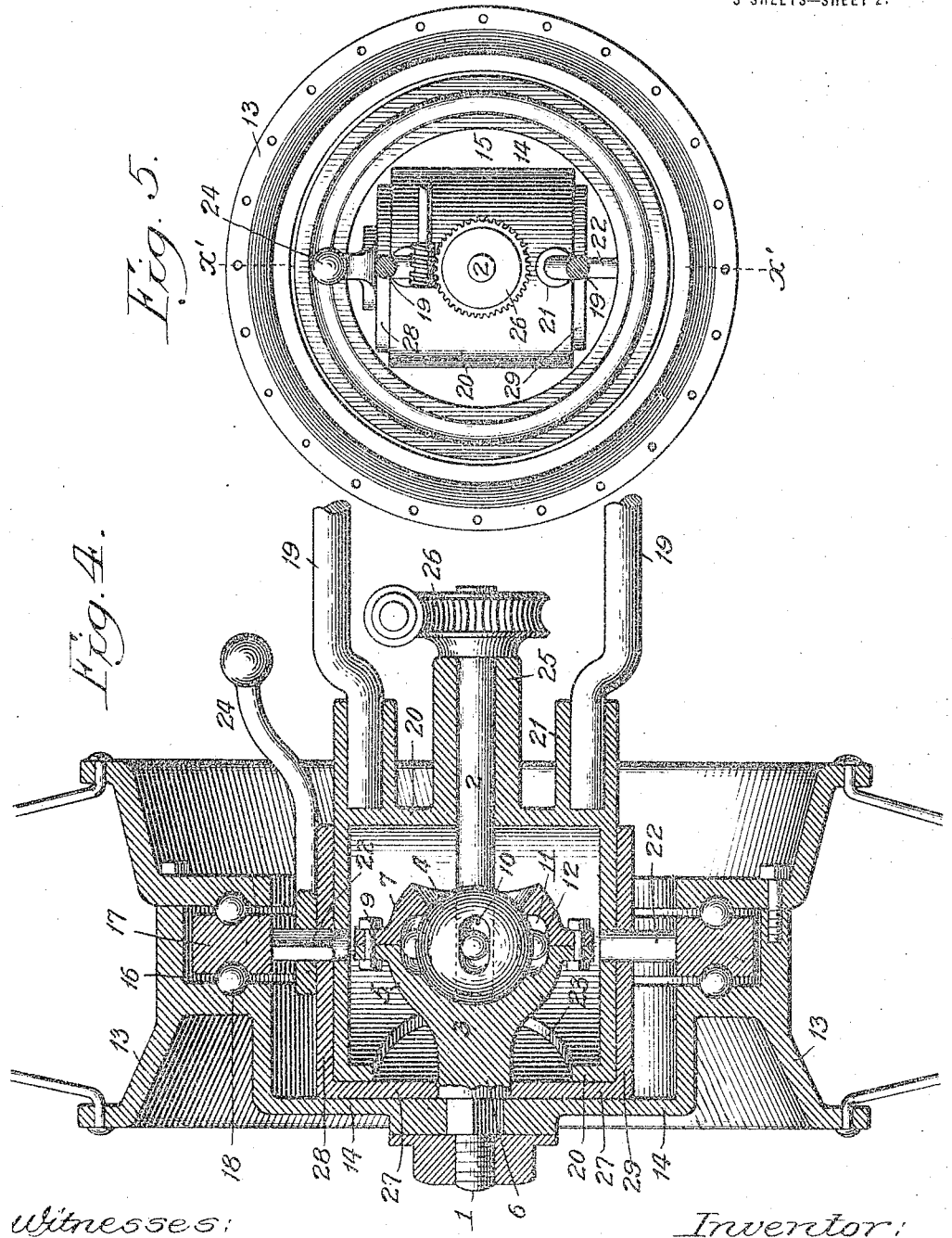

UNITED STATES PATENT OFFICE.

MONS C. CHRISTENSEN, OF CHICAGO, ILLINOIS.

UNIVERSAL SHAFT-COUPLING.

1,142,750.  Specification of Letters Patent.  Patented June 8, 1915.

Application filed March 30, 1914. Serial No. 828,327.

*To all whom it may concern:*

Be it known that I, MONS C. CHRISTENSEN, a citizen of the United States of America, and a resident of Chicago, in the county of Cook, State of Illinois, have invented certain new and useful Improvements in Universal Shaft-Couplings, of which the following is a specification.

This invention is of the spheroidal type of universal shaft couplings, and has for its object to provide a simple and efficient structural formation and combination of parts adapted to permit the required range of swinging movement of one shaft section with relation to the other, with the maintenance of a strong driving connection between the parts.

Another object is to provide an efficient combination and arrangement of parts wherein the universal coupling is adapted for effective use in the driving connections of a pivotally adjustable driving wheel of a motor vehicle or the like. All as will hereinafter more fully appear.

Figure 6:
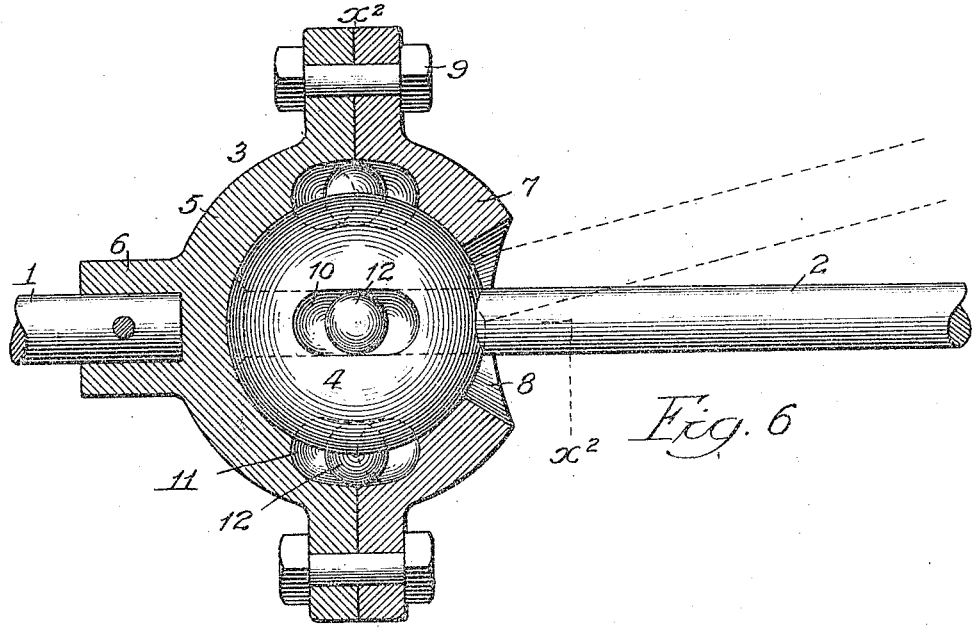
Figure 7:
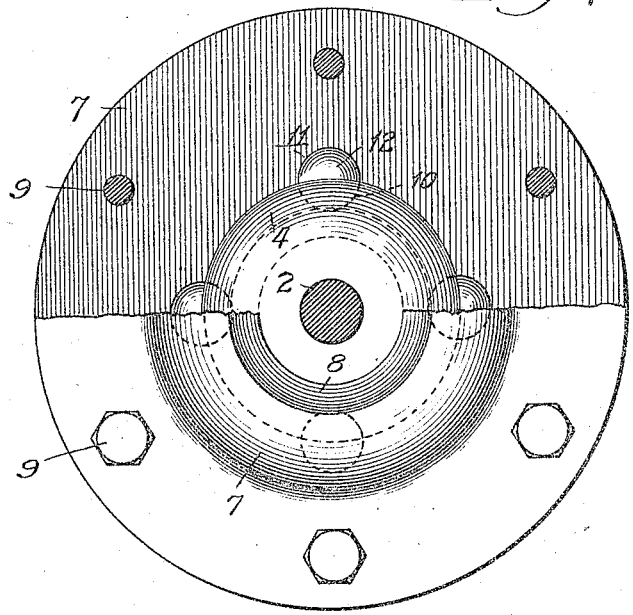

In the accompanying drawings: Figure 1, is a view, partly in section, illustrating the general arrangement of parts in which the present coupling is used as a part of the driving mechanism of a pivotally mounted driving wheel of a motor vehicle, the hubs of the wheels and the fixed axle on which they are mounted, being shown. Fig. 2, is a detail plan view of the inclosing shell or casing and its accessories, of the universal coupling. Fig. 3, is a detail horizontal section on line $x-x$, Fig. 1. Fig. 4, is an enlarged detail vertical section, on line $x'-x'$, Fig. 5, showing the arrangement and connection of the universal coupling to a wheel hub, and the supporting, adjusting and driving connections thereof. Fig. 5, is a rear elevation of the same with the main axle in section. Fig. 6, is a longitudinal sectional elevation of the universal coupling. Fig. 7, is a transverse section, on line $x^2-x^2$, Fig. 6.

Similar reference numerals indicate like parts in the several views.

Referring to the drawings, 1 and 2, represent the ends of two sections of shafting to which are attached the respective outer and inner members 3 and 4 of the present universal coupling, and which in the present improvement have a detail construction as follows: The outer coupling member 3, comprises a main section or head 5, of a semi-spherical form, provided with a central hub or boss 6, for the attachment of the section 1 of shafting, and a removable cap or section 7, of a semi-spherical form and having a central flowing opening 8 for the free oscillatory movement of the section 2 of shafting which passes through said opening. The hub 5 and cap 7 are secured together by connecting bolts 9, passing through marginal flanges on the respective parts, or by any other well known and suitable fastening means. The inner coupling member 4, comprises a spherically formed head, attached in any usual and suitable manner on the end of the section 2 of shafting, and corresponding in size and disposed within the above described spherical cavity of the hub 5 and cap 7. In the present improvement, the periphery of the head of the inner coupling member 4 is formed with a series of longitudinally disposed channels 10, preferably four in number, and equally spaced in a transverse direction around the periphery of the head of the coupling member 4, aforesaid. The inner wall of the spherical cavity of the outer coupling member 3, is formed with a companion series of longitudinally disposed channels 11, adapted to register with the channels 10 above described.

12 are individual balls or spheres disposed in individual pairs of the channels 10, 11, to constitute the driving connections between the outer and inner coupling members 3 and 4 above described, and adapted to permit the universal oscillatory movement of one member with relation to the other.

In the application of the present invention to a pivotally mounted driving wheel of a motor vehicle, a construction and arrangement of parts as follows is employed. 13 is the wheel hub, formed with an outer end web 14 having driven connection with the section 1 of shafting and with the outer member 3, of the coupling, aforesaid, and is also formed with an inner central chamber 15 in which the universal coupling and its hereinafter described accessories are arranged midway the length of the hub, and with an annular chamber 16, formed as a ball race, and adapted to receive a nonrevoluble companion member of a ball-bearing by which the hub is revolubly mounted, and which non-revoluble member consists of an annular ring 17, rectangular in cross-section, and formed with annular grooves in its opposite faces for a series of balls 18, as shown in Fig. 4. Corresponding annular grooves are formed in the walls of the annular chamber 16, aforesaid for said series of balls, to complete the ball bearing for the hub, above referred to.

For convenience in assemblage of the ball bearing parts, just described, the wheel hub is made in two parts and bolted together as shown in Fig. 4.

19 is the fixed axle of a vehicle, upon the ends of which the pair of wheel hubs 13 aforesaid are pivotally mounted by means as follows: 20 is a vertically disposed cylindrical casing attached to an end of the axle 19, by hubs 21, or other usual attaching means. Said casing is formed with top and bottom heads having central orifices to provide bearings for the pair of radially opposed journal shafts or trunnions 22 by which the ball-bearing ring 17, above described, is pivotally connected to said casing 20. At one side said cylindrical casing 20, is formed with an enlarged opening 23, for the free movement of the outer member 3 of the universal coupling. 24 is a steering arm or lever fixed on one of the radial journal shafts or trunnions 22, to provide means for effecting the required adjustment of the wheel hub in a horizontal plane.

In the construction shown in the drawings, the section 1 of shafting carrying the inner member 4 of the universal coupling is journaled in a central horizontal bearing sleeve 25 of the casing 20, and is provided at one end with a worm wheel 26, or other usual means for operative connection with the power mechanism of a motor vehicle.

27 is a semi-cylindrical casing provided with top and bottom heads 28 and 29, which in turn are provided with central orifices adapted to encircle the radial journal shafts or trunnions 22, aforesaid and have pivotal movement thereon in a horizontal plane and along with the wheel hub 13 in the adjustment of the same. And to such end, the vertical wall of said casing 27 is formed with an aperture to receive the hub portion of the outer coupling member 3 adjacent to the point of said hub portion to the outer end web 14 of the hub.

In the preferred construction shown in Fig. 4, the casing 27 is adapted to have bearing upon the periphery of the nonrevoluble casing 20, aforesaid, as well as upon the top and bottom heads of said casing 20, with a view to attain maximum rigidity between the parts in actual use.

Having thus fully described my said invention, what I claim as new and desire to secure by Letters Patent, is:—

1. The combination of a vehicle axle, a vertically arranged cylindrical casing secured on an end of said axle and having top and bottom heads and an open vertical wall, a driving shaft journaled in said casing and carrying one member of a universal coupling, a wheel hub having a central cavity receiving the vertical casing aforesaid, an outer end web carrying the other member of the universal coupling and an annular chamber mid-length of the hub, an annular ring having bearing in said annular chamber, a series of radial trunnions extending inwardly from said annular ring and having bearing in the cylindrical casing aforesaid, and a steering arm fixedly secured to one of said trunnions, substantially as set forth.

2. The combination of a vehicle axle, a vertically arranged cylindrical casing secured on an end of said axle and having top and bottom heads and an open vertical wall, a driving shaft journaled in said casing and carrying one member of a universal coupling, a wheel hub having a central cavity receiving the vertical casing aforesaid, an outer end web carrying the other member of the universal coupling and an annular chamber mid-length of the hub, an annular ring disposed in said annular chamber, the opposed faces of the ring and the chamber being formed with ball races, a series of balls in said races, a series of radial trunnions extending inwardly from said annular ring and having bearing in the cylindrical casing aforesaid, and a steering arm fixedly secured to one of said trunnions, substantially as set forth.

3. The combination of a vehicle axle, a vertically arranged cylindrical casing secured on an end of said axle and having top and bottom heads and an open vertical wall, a driving shaft journaled in said casing and carrying one member of a universal coupling, a wheel hub having a central cavity receiving the vertical casing aforesaid, an outer end web carrying the other member of the universal coupling and an annular chamber mid-length of the hub, an annular ring having bearing in said annular chamber, a semi-cylindrical casing fitting the exterior of said cylindrical casing and attached to the wheel hub, a series of radial trunnions extending inwardly from the aforesaid annular ring through the semi-cylindrical casing and having bearings in the cylindrical casing, and a steering arm fixedly secured to one of said trunnions, substantially as set forth.

4. The combination of a vehicle axle, a vertically arranged cylindrical casing secured on an end of said axle and having top and bottom heads and an open vertical wall, a driving shaft journaled in said casing and carrying one member of a universal coupling, a wheel hub having a central cavity receiving the vertical casing aforesaid, an outer end web carrying the other member of the universal coupling and an annular chamber mid-length of the hub, an annular ring disposed in said annular chamber, the opposite faces of the ring and the chamber being formed with ball-races, a series of balls in said races, a semi-cylindrical casing fitting the exterior of said cylindrical casing and attached to the wheel hub, a series of radial trunnions extending inwardly from the aforesaid annular ring through the semi-cylindrical casing and having bearings in the cylindrical casing, and a steering arm fixedly secured to one of said trunnions, substantially as set forth.

Signed at Chicago, Illinois, this 26th day of March 1914.

MONS C. CHRISTENSEN.

Witnesses:
 ROBERT BURNS,
 IVA L. CRANE.